(12) United States Patent
Hitomi et al.

(10) Patent No.: US 11,501,645 B2
(45) Date of Patent: Nov. 15, 2022

(54) PLATOON ORGANIZATION DEVICE, PLATOON ORGANIZATION METHOD, AND PLATOON ORGANIZATION PROGRAM

(71) Applicant: TOYOTA JIDOSHA KABUSHIKI KAISHA, Toyota (JP)

(72) Inventors: Masao Hitomi, Toyota (JP); Yu Nishikata, Musashimurayama (JP); Kousuke Matsuyama, Hino (JP); Maiko Eguchi, Hino (JP); Seiji Kuroki, Hino (JP); Hiroaki Kawahara, Hino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 16/880,307

(22) Filed: May 21, 2020

(65) Prior Publication Data

US 2020/0380871 A1 Dec. 3, 2020

(30) Foreign Application Priority Data

May 30, 2019 (JP) .............................. JP2019-101017

(51) Int. Cl.
*G08G 1/00* (2006.01)
*G06Q 10/08* (2012.01)
*G07C 5/00* (2006.01)
*G07C 5/08* (2006.01)

(52) U.S. Cl.
CPC ........... *G08G 1/22* (2013.01); *G06Q 10/0832* (2013.01); *G07C 5/008* (2013.01); *G07C 5/0841* (2013.01); *G08G 1/20* (2013.01)

(58) Field of Classification Search
USPC ....................................................... 701/117
See application file for complete search history.

(56) References Cited

U.S. PATENT DOCUMENTS

2016/0267795 A1\* 9/2016 Miyazawa .......... B60W 30/165
2016/0267796 A1\* 9/2016 Hiroma .................. G08G 1/166

FOREIGN PATENT DOCUMENTS

| JP | 2010-79497 A | 4/2010 | |
| JP | 2010-149636 A | 7/2010 | |
| JP | 2010-149637 A | 7/2010 | |
| JP | 2020194477 A | * 12/2020 | ......... G06Q 10/0832 |
| WO | 2015/068501 A1 | 5/2015 | |
| WO | 2015/068502 A1 | 5/2015 | |

\* cited by examiner

*Primary Examiner* — Tyler D Paige
(74) *Attorney, Agent, or Firm* — Sughrue Mion, PLLC

(57) ABSTRACT

A platoon organization device includes: an acquisition unit configured to acquire operation plan information including a departure place, a destination, and information indicating whether the vehicle corresponds to a special vehicle, of each vehicle, the special vehicle being a vehicle having at least one of a predetermined function and equipment that resolves an event when the event that requires stopping of the vehicle occurs in at least one of the vehicle and a driver; an extraction unit configured to extract a plurality of vehicles having at least a part of sections in common in a course from the departure place to the destination; an organization unit configured to organize a platoon including the vehicles such that at least one special vehicle is included in a vehicle group organizing the platoon from a platoon departure place to a platoon destination; and an output unit configured to output platoon information.

5 Claims, 6 Drawing Sheets

Fig. 3

| VEHICLE ID | DEPARTURE PLACE | DESTINATION | ROUTE | PRESENCE OR ABSENCE OF REPAIR EQUIPMENT (PRESENCE=1, ABSENCE=0) | PRESENCE OR ABSENCE OF TOILET (PRESENCE=1, ABSENCE=0) | PRESENCE OR ABSENCE OF DRIVER |
|---|---|---|---|---|---|---|
| 1 | TOKYO | FUKUOKA | TOMEI | 1 | 0 | PRESENCE |
| 2 | TOKYO | HIROSHIMA | TOMEI | 0 | 0 | ABSENCE |
| 3 | TOKYO | FUKUOKA | TOMEI | 0 | 0 | ABSENCE |
| 4 | TOKYO | OSAKA | TOMEI | 0 | 1 | PRESENCE |
| 5 | TOKYO | KUMAMOTO | TOMEI | 0 | 0 | ABSENCE |
| ... | ... | ... | ... | ... | ... | ... |
| 11 | OSAKA | FUKUOKA | ... | 0 | 1 | PRESENCE |
| 12 | HIROSHIMA | FUKUOKA | ... | 0 | 1 | PRESENCE |
| ... | ... | ... | ... | ... | ... | ... |
| 21 | TOKYO | NIIGATA | JOETSU | 1 | 1 | PRESENCE |
| ... | ... | ... | ... | ... | ... | ... |

Fig.4

| VEHICLE ID | DEPARTURE PLACE | DESTINATION | ROUTE | PRESENCE OR ABSENCE OF REPAIR EQUIPMENT (PRESENCE=1, ABSENCE=0) | PRESENCE OR ABSENCE OF TOILET (PRESENCE=1, ABSENCE=0) | PRESENCE OR ABSENCE OF DRIVER |
|---|---|---|---|---|---|---|
| 1 | TOKYO | FUKUOKA | TOMEI | 1 | 0 | PRESENCE |
| 2 | TOKYO | HIROSHIMA | TOMEI | 0 | 0 | ABSENCE |
| 3 | TOKYO | FUKUOKA | TOMEI | 0 | 0 | ABSENCE |
| 4 | TOKYO | OSAKA | TOMEI | 0 | 1 | PRESENCE |
| 5 | TOKYO | KUMAMOTO | TOMEI | 0 | 0 | ABSENCE |

PLATOON ORGANIZATION DEVICE, PLATOON ORGANIZATION METHOD, AND PLATOON ORGANIZATION PROGRAM

TECHNICAL FIELD

The present disclosure relates to a platoon organization device, a platoon organization method, and a platoon organization program.

CROSS-REFERENCE TO RELATED APPLICATION

This application claims the benefit of priority from Japanese Patent Application No. 2019-101017, filed May 30, 2019, the entire contents of which are incorporated herein by reference.

BACKGROUND

In transporting packages by a vehicle, platoon traveling is performed to improve transport efficiency and the like. There are various ways to organize a platoon. For example, a platoon is organized with manned vehicles at the head and unmanned vehicles by autonomous driving after that. With regard to platoon traveling of vehicles, for example, a technology related to traveling control for incorporating independently traveling vehicles into a platoon is known (for example, see International Publication No. 2015/068051).

SUMMARY

In the platoon traveling of the vehicles, it is preferable to continue traveling while maintaining the platoon as much as possible in order to improve transport efficiency of packages and the like. However, when a driver as an occupant needs to go to the toilet or a failure occurs in the vehicle, the platoon traveling is required to be stopped.

An object of the present disclosure is to suppress stopping of a platoon in platoon traveling of vehicles transporting packages.

According to an aspect of the present disclosure, there is provided a platoon organization device that organizes a platoon of vehicles transporting packages. The platoon organization device includes: an acquisition unit configured to acquire operation plan information including a departure place, a destination, and information indicating whether the vehicle corresponds to a special vehicle, of each vehicle, the special vehicle being a vehicle having at least one of a predetermined function and equipment that resolves an event when the event that requires stopping of the vehicle occurs in at least one of the vehicle and a driver; an extraction unit configured to extract a plurality of vehicles having at least a part of sections in common in a course from the departure place to the destination, based on the operation plan information; an organization unit configured to organize a platoon including the vehicles extracted by the extraction unit such that at least one special vehicle is included in a vehicle group organizing the platoon from a platoon departure place, which is a departure place of the platoon, to a platoon destination, which is a destination of the platoon; and an output unit configured to output platoon information indicating the platoon organized by the organization unit.

According to an aspect of the present disclosure, there is provided a platoon organization method in a platoon organization device that organizes a platoon of vehicles transporting packages. The platoon organization method includes: acquiring operation plan information including a departure place, a destination, and information indicating whether the vehicle corresponds to a special vehicle, of each vehicle, the special vehicle being a vehicle having at least one of a predetermined function and equipment that resolves an event when the event that requires stopping of the vehicle occurs in at least one of the vehicle and a driver; extracting a plurality of vehicles having at least a part of sections in common in a course from the departure place to the destination, based on the operation plan information; organizing a platoon including the vehicles extracted by the extraction unit such that at least one special vehicle is included in a vehicle group organizing the platoon from a platoon departure place, which is a departure place of the platoon, to a platoon destination, which is a destination of the platoon; and outputting platoon information indicating the platoon organized by the step of organizing.

According to an aspect of the present disclosure, there is provided a platoon organization program for causing a computer to function as a platoon organization device that organizes a platoon of vehicles transporting packages. The platoon organization program causing the computer to realize: an acquisition function of acquiring operation plan information including a departure place, a destination, and information indicating whether the vehicle corresponds to a special vehicle, of each vehicle, the special vehicle being a vehicle having at least one of a predetermined function and equipment that resolves an event when the event that requires stopping of the vehicle occurs in at least one of the vehicle and a driver; an extraction function of extracting a plurality of vehicles having at least a part of sections in common in a course from the departure place to the destination, based on the operation plan information; an organization function of organizing a platoon including the vehicles extracted by the extraction function such that at least one special vehicle is included in a vehicle group organizing the platoon from a platoon departure place, which is a departure place of the platoon, to a platoon destination, which is a destination of the platoon; and an output function of outputting platoon information indicating the platoon organized by the organization function.

According to the above aspects, when an event that requires stopping of the vehicle occurs in the vehicle or the driver, a platoon is organized such that a special vehicle having a predetermined function or equipment capable of resolving the event is carried along with the platoon from the platoon departure place to the platoon destination. Thereby, even when an event that requires stopping of the vehicle occurs, the event can be resolved by the special vehicle, so that it is possible to suppress stopping of the platoon in the platoon traveling of the vehicles.

In the platoon organization device according to another aspect, the special vehicle may be a repair vehicle, which is a vehicle having equipment for repairing the vehicle, and the organization unit may be configured to organize the platoon such that the repair vehicle is included in the vehicle group organizing the platoon from the platoon departure place to the platoon destination.

According to the above aspect, when any failure occurs in the vehicles organizing the platoon, the platoon is organized such that a repair vehicle having equipment capable of performing repairs is carried along with the platoon from the platoon departure place to the platoon destination. Thereby, even when a failure occurs in the vehicle, the repair can be performed by the repair vehicle, so that it is possible to suppress stopping of the platoon in the platoon traveling of the vehicles.

In the platoon organization device according to another aspect, the special vehicle may be a toilet vehicle, which is a vehicle provided with a toilet for use by an occupant, and the organization unit may be configured to organize the platoon such that the toilet vehicle is included in the vehicle group organizing the platoon from the platoon departure place to the platoon destination.

According to the above aspect, the platoon is organized such that a toilet vehicle provided with a toilet is carried along with the platoon from the platoon departure place to the platoon destination. Thereby, even when an occupant of the vehicle in the platoon needs to use a toilet, the occupant can use the toilet of the toilet vehicle, so that t is possible to suppress stopping of the platoon in the platoon traveling of the vehicles.

In the platoon organization device according to another aspect, the organization unit may be configured to organize the platoon such that a leading vehicle group including at least one vehicle of which a destination is the platoon destination is disposed at a head of the platoon and the special vehicle is included in the leading vehicle group.

According to the above aspect, the platoon is organized such that the special vehicle is included in the leading vehicle group constituted by vehicles of which a destination is the platoon destination, so that the platoon including the special vehicle is maintained up to the platoon destination. Further, the use of the special vehicle by the occupant of the vehicle in the leading vehicle group becomes easy.

In the platoon organization device according to another aspect, the organization unit may be configured to, when organizing a first special vehicle of which a departure place is the platoon departure place and a destination is an intermediate place between the platoon departure place and the platoon destination by including the first special vehicle in the platoon, organize a second special vehicle of which a departure place is the intermediate place and a destination is the platoon destination by including the second special vehicle in the platoon.

According to the above aspect, even when the destination of the special vehicle to be followed from the platoon departure place is an intermediate place, another special vehicle is included in the platoon in the section from the intermediate place to the platoon destination. Therefore, it is possible to carry special vehicles along the entire section from the platoon departure place to the platoon destination.

In the platoon organization device according to another aspect, the operation plan information may include information indicating whether the vehicle is at least one of an unmanned autonomous driving vehicle and a manned vehicle, and the organization unit may dispose a manned vehicle at a head of the platoon.

According to the above aspect, the platoon traveling of the vehicle group is appropriately performed by the occupant of the leading vehicle.

According to one aspect of the present disclosure, it is possible to suppress stopping of a platoon in platoon traveling of vehicles transporting packages.

BRIEF DESCRIPTION OF THE DRAWINGS

FIG. 3 is a diagram illustrating a configuration of operation plan information and an example of data stored therein.

FIG. 4 is a diagram illustrating an example of the operation plan information extracted based on a departure place and a route.

DETAILED DESCRIPTION

Figure 1:
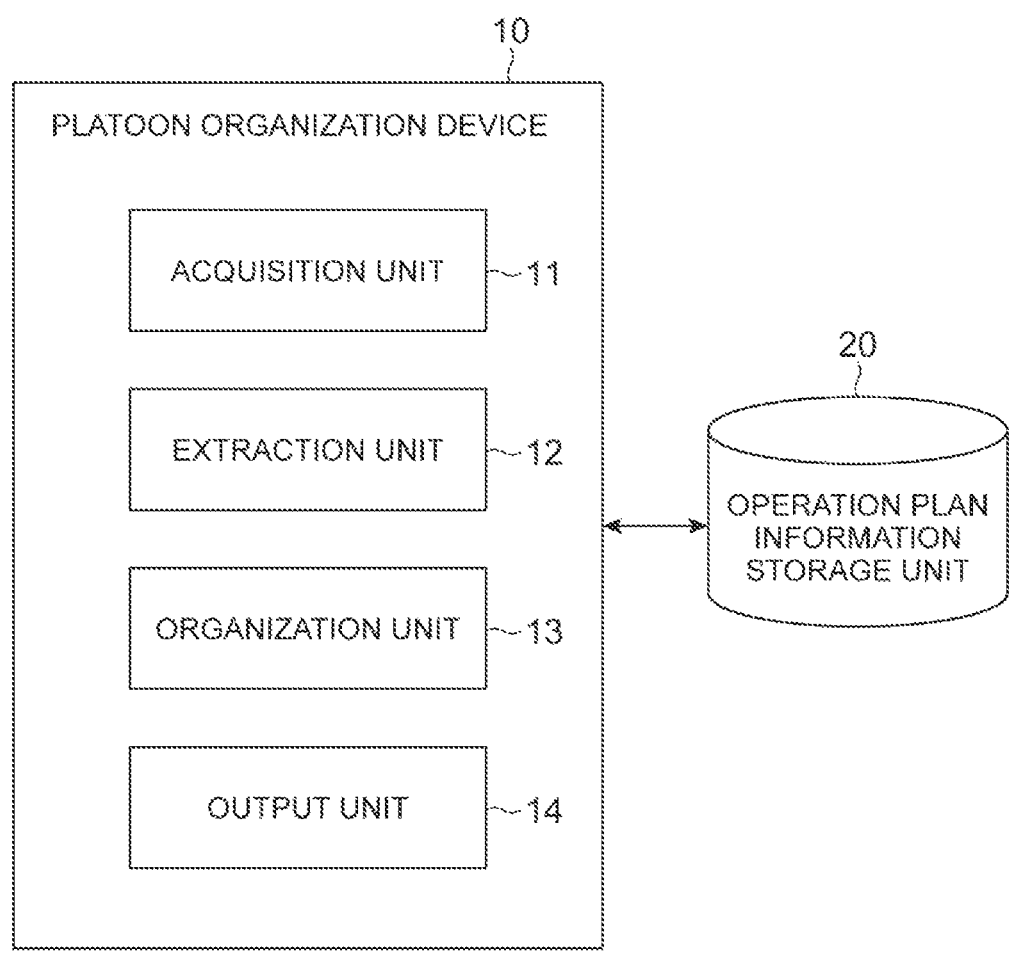
FIG. 1 is a block diagram illustrating a functional configuration of a platoon organization device according to an embodiment.

Hereinafter, an embodiment of the present disclosure will be described in detail with reference to the drawings. In the description of the drawings, the same or equivalent elements are denoted by the same reference numerals, and redundant description will be omitted.

FIG. 1 is a block diagram illustrating a functional configuration of a platoon organization device according to an embodiment. A platoon organization device 10 is a device that organizes a platoon of vehicles transporting packages. The platoon organization device 10 is configured to include, for example, a computer such as a server. As illustrated in FIG. 1, the platoon organization device 10 of the present embodiment functionally includes an acquisition unit 11, an extraction unit 12, an organization unit 13, and an output unit 14. Each functional unit of the platoon organization device 10 is configured to be able to access a storage unit such as an operation plan information storage unit 20. The operation plan information storage unit 20 may be configured to be included in the platoon organization device 10 or may be configured as another device outside the platoon organization device 10.

Figure 2:
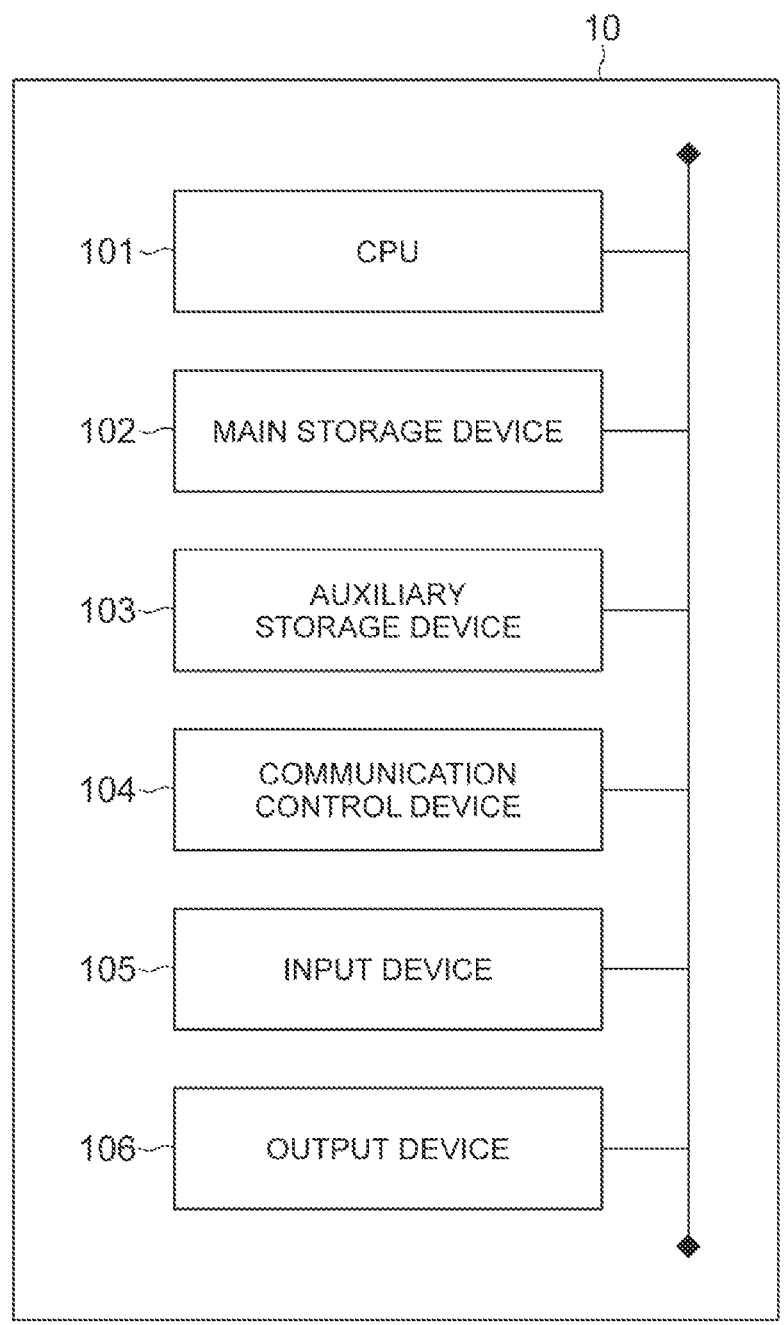
FIG. 2 is a diagram illustrating a hardware configuration of the platoon organization device.

FIG. 2 is a hardware configuration diagram of the platoon organization device 10. As illustrated in FIG. 2, the platoon organization device 10 physically configured as a computer system including a CPU 101, a main storage device 102 configured to include a memory such as a RAM and a ROM, an auxiliary storage device 103 configured to include a hard disk and the like, a communication control device 104, and the like. The platoon organization device 10 may further include an input device 105 such as a keyboard, a touch panel, and a mouse, which are input devices, and an output device 106 such as a display.

Each function illustrated in FIG. 1 is realized by reading predetermined computer software on hardware such as the CPU 101 and the main storage device 102 illustrated in FIG. 2 to operate the communication control device 104 and the like under the control of the CPU 101, and reading and writing data in the main storage device 102 and the auxiliary storage device 103. Data and databases required for processing are stored in the main storage device 102 or the auxiliary storage device 103. In the present embodiment, each of the functional units 11 to 14 is configured to be included in the platoon organization device 10, but may be configured to be distributed to a plurality of computers. The devices configured to include the platoon organization device 10 are not limited to servers, and may be mobile terminals such as high-performance mobile phones (smartphones), tablet computers, mobile phones, and personal digital assistants (PDAs).

Referring to FIG. 1 again, each functional unit of the platoon organization device 10 will be described. The acquisition unit 11 acquires operation plan information. Specifically, the acquisition unit 11 acquires the operation plan information stored in the operation plan information storage unit. The operation plan information of the present embodiment includes information on a departure place and a destination of each vehicle determined according to the package to be transported. The operation plan information further includes information indicating whether each vehicle corresponds to a special vehicle.

FIG. 3 is a diagram illustrating a configuration of operation plan information and an example of data included therein. As illustrated in FIG. 3, the operation plan information includes a departure place, a destination, a route, information indicating the presence or absence of repair equipment, information indicating the presence or absence of a toilet, and information indicating the presence or absence of a driver in association with a vehicle ID for identifying a vehicle. The departure place, the destination, and the route are information indicating the departure place, the destination, and the route, respectively, in a course of transporting the package by the vehicle. The information indicating the presence or absence of repair equipment and the information indicating the presence or absence of a toilet are information indicating whether each vehicle corresponds to a special vehicle.

The information indicating the presence or absence of repair equipment is information indicating whether the vehicle is a repair vehicle that is a special vehicle having equipment for repairing the vehicle. The repair vehicle has equipment such as various parts and tools necessary for repairing the vehicle. When a failure or the like occurs in the vehicle, a driver of the vehicle can repair the vehicle by using the equipment of the repair vehicle. Therefore, if the repair vehicle is included in the platoon, even when a failure occurs in the vehicle in the platoon traveling, repair can be performed without waiting for the arrival of parts and tools for repair.

The information indicating the presence or absence of a toilet is information indicating whether the vehicle is a toilet vehicle that is a special vehicle provided with a toilet for use by an occupant. When the occupant needs to use the toilet, the occupant can use the toilet while the platoon is temporarily stopped or the platoon traveling is continued. Therefore, if the toilet vehicle is included in the platoon, even when the occupant of the vehicle in the platoon traveling needs to use the toilet, there is no need to stop the platoon-traveling-vehicle at the place where the toilet is located.

The operation plan information can include information indicating the presence or absence of a driver. That is, the information indicating the presence or absence of a driver is information indicating whether the vehicle is an unmanned autonomous driving vehicle or a manned vehicle. Since a leading vehicle in the platoon traveling needs to be a manned vehicle, the information indicating the presence or absence of a driver is referred to when organizing the platoon.

The extraction unit 12 extracts a plurality of vehicles having at least a part of sections in common in the course from the departure place to the destination, based on the operation plan information. In the present embodiment, for example, the extraction unit 12 extracts vehicles having the same destination in the operation plan information. For example, the extraction unit 12 extracts vehicles having the same route in the operation plan information. Further, as will be described later with reference to a flowchart, the extraction unit 12 may extract a vehicle of which a departure place is an intermediate place between a platoon departure place, which is a departure place of the platoon, and a platoon destination, which is a destination of the platoon.

FIG. 4 is a diagram illustrating an example of the operation plan information extracted based on a departure place and a route. As illustrated in FIG. 4, the extraction unit 12 extracts the operation plan information of the vehicle of which a departure place is "Tokyo" and of which a route is "Tomei" by referring to the operation plan information illustrated in FIG. 3. The vehicle of the operation plan information extracted in this way is a candidate for a vehicle organizing a platoon.

The organization unit 13 organizes a platoon including a plurality of vehicles for causing the vehicles transporting packages to perform platoon traveling. Specifically, the organization unit 13 organizes a platoon including the vehicles extracted by the extraction unit 12. In the present embodiment, the organization unit 13 organizes a platoon such that at least one special vehicle is included in a vehicle group organizing the platoon from the platoon departure place, which is a departure place of the platoon, to the platoon destination, which is a destination of the platoon.

For example, the organization unit 13 organizes a platoon such that a repair vehicle among the special vehicles is included in the vehicle group organizing the platoon from the platoon departure place to the platoon destination. Further, the organization unit 13 may organize the platoon such that a toilet vehicle among the special vehicles is included in the vehicle group organizing the platoon from the platoon departure place to the platoon destination.

Figure 5:
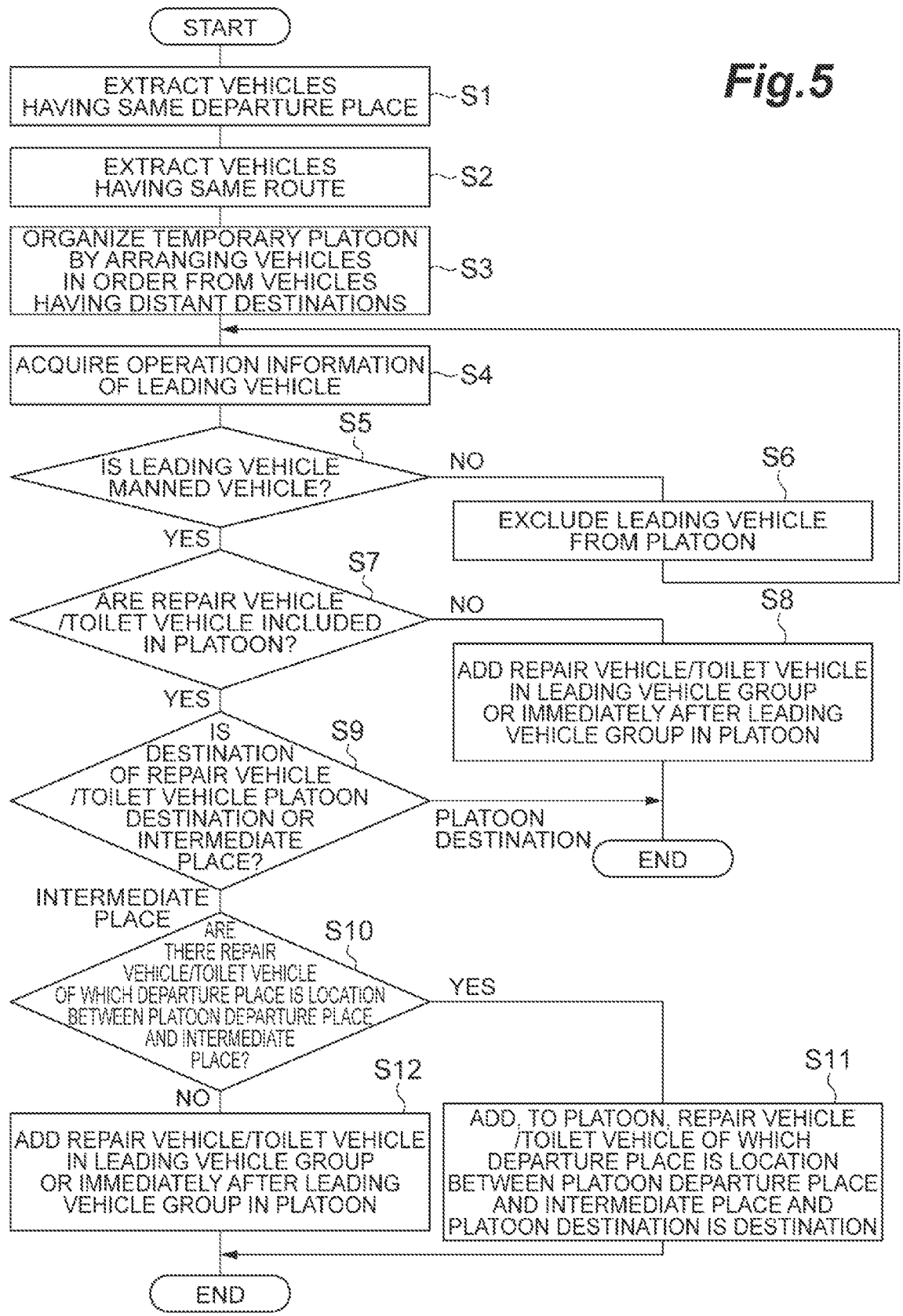
FIG. 5 is a flowchart illustrating a processing content of a platoon organization method performed in the platoon organization device.

With reference to FIG. 5, an organization process of the platoon by the organization unit 13 will be described. FIG. 5 is a flowchart illustrating a processing content of a platoon organization method performed in the platoon organization device 10.

In step S1, the extraction unit 12 extracts vehicles having the same departure place by referring to the operation plan information. In step S2, the extraction unit 12 further extracts vehicles having the same route from the vehicles extracted in step S. Thereby, the operation plan information of the vehicles as illustrated in FIG. 4 are extracted, for example.

In step S3, the organization unit 13 organizes a temporary platoon by arranging the plurality of vehicles extracted in step S2 in order from those having distant destinations. For example, when the vehicles as illustrated in FIG. 4 have been extracted in step S2, the organization unit 13 organizes a temporary platoon by arranging the vehicles in the order of (5-1-3-2-4) if indicated by the vehicle ID.

Next, in step S4, the organization unit 13 acquires operation information of a leading vehicle. Then, in step S5, the organization unit 13 determines whether the leading vehicle is a manned vehicle. When it is determined that the leading vehicle is a manned vehicle, the process proceeds to step S7. Meanwhile, when it is not determined that the leading vehicle is a manned vehicle, the process proceeds to step S6. For example, when the leading vehicle in the platoon organized in step S3 is a vehicle with a vehicle ID "5", the vehicle is an unmanned (autonomous driving) vehicle, so that the process proceeds to step S6.

In step S6, the organization unit 13 excludes the vehicle disposed at the head from the platoon. Then, by repeating the processes of step S4 and step S5, a manned vehicle is arranged at the head of the platoon. Thereby, a platoon indicated by a vehicle ID (1-3-2-4) is organized. In the example of the platoon, the platoon departure place is Tokyo and the platoon destination is Fukuoka.

In step S7, the organization unit 13 determines whether the repair vehicle and the toilet vehicle are included in the platoon. When it is determined that the repair vehicle and the toilet vehicle are included in the platoon, the process proceeds to step S9. Meanwhile, when it is not determined that the repair vehicle and the toilet vehicle are included in the platoon, the process proceeds to step S8.

In step S8, the organization unit 13 adds the repair vehicle/the toilet vehicle in the leading vehicle group or immediately after the leading vehicle group in the platoon.

In step S9, the organization unit 13 determines whether the destination of the repair vehicle/the toilet vehicle is a platoon destination or an intermediate place. The intermediate place is a location positioned between the platoon departure place and the platoon destination. When it is determined that the destination of the repair vehicle/the toilet vehicle is a platoon destination, the process for including the repair vehicle/the toilet vehicle in the platoon is ended. Meanwhile, when it is determined that the destination of the repair vehicle/the toilet vehicle is an intermediate place, the process proceeds to step S10.

In step S10, the organization unit 13 determines whether there are the repair vehicle/the toilet vehicle of which a departure place is a location between the platoon departure place and the intermediate place by referring to the operation plan information. When it is determined that there are the repair vehicle/the toilet vehicle of which a departure place is a location between the platoon departure place and the intermediate place, the process proceeds to step S11. Meanwhile, when it is not determined that there are the repair vehicle/the toilet vehicle of which a departure place is a location between the platoon departure place and the intermediate place, the process proceeds to step S12.

In step S11, the organization unit 13 adds, to the platoon, the repair vehicle/the toilet vehicle of which a departure place is a location between the platoon departure place and the intermediate place and a platoon destination is a destination. For example, when the platoon organized by the vehicle of the operation plan information illustrated in FIG. 4 is indicated by the vehicle ID (1-3-2-4), the destination of a vehicle with a vehicle ID "4", which is a toilet vehicle, is "Osaka", which is an intermediate place (step S9), so that the organization unit 13 extracts a vehicle with a vehicle ID "11" of which a departure place is "Osaka" and a destination is "Fukuoka", which is a platoon destination, by referring the operation plan information illustrated in FIG. 3 (steps S10 and S11). Then, the organization unit 13 adds the extracted vehicle with the vehicle ID "11" to the vehicle group organizing the platoon.

In step S12, the organization unit 13 adds the repair vehicle/the toilet vehicle in the leading vehicle group or immediately after the leading vehicle group in the platoon. Thus, the process for including the repair vehicle/the toilet vehicle in the platoon is ended.

The organization unit 13 can organize the platoon in which both the repair vehicle and the toilet vehicle are appropriately included by performing the processes such as the determination and the addition illustrated in steps S7 to S12 on one special vehicle out of the repair vehicle and the toilet vehicle and performing the processes such as the determination and the addition illustrated in steps S7 to S12 on the other special vehicle out of the repair vehicle and the toilet vehicle.

Referring to FIG. 1 again, the output unit 14 outputs platoon information indicating the platoon organized by the organization unit 13. For example, the output unit 14 outputs platoon information indicated by the vehicle ID (1-3-2-4).

Figure 6:
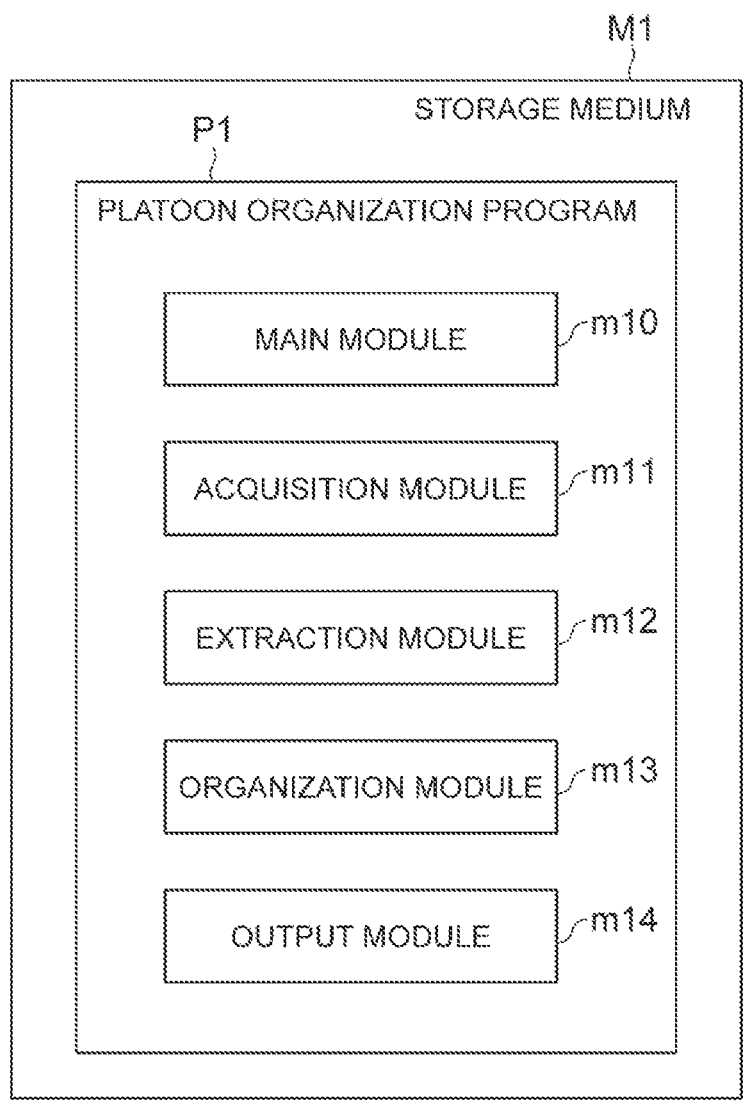
FIG. 6 is a diagram illustrating a configuration of a platoon organization program.

Next, referring to FIG. 6, a platoon organization program for causing a computer to function as the platoon organization device 10 will be described. A platoon organization program Pt includes a main module m10, an acquisition module m11, an extraction module m12, an organization module m13, and an output module m14.

The main module m10 is a part that comprehensively controls a platoon organization process. By executing the acquisition module m11, the extraction module m12, the organization module m13, and the output module m14, the functions of the acquisition unit 11, the extraction unit 12, the organization unit 13, and the output unit 14 of the platoon organization device 10 illustrated in FIG. 1 are realized.

The platoon organization program P1 is provided by a storage medium M1 such as a magnetic disk, an optical disk, or a semiconductor memory. The platoon organization program P1 may be provided via a communication network as a computer data signal superimposed on a carrier wave.

According to the platoon organization device 10, the platoon organization method, and the platoon organization program Pt of the present embodiment described above, when an event that requires stopping of the vehicle occurs in the vehicle or the driver, a platoon is organized such that a special vehicle having a predetermined function or equipment capable of resolving the event is carried along with the platoon from the platoon departure place to the platoon destination. Thereby, even when an event that requires stopping of the vehicle occurs, the event can be resolved by the special vehicle, so that it is possible to suppress stopping of the platoon in the platoon traveling of the vehicles.

The present disclosure has been described in detail based on the embodiment. However, the present disclosure is not limited to the above embodiment. The present disclosure can be variously modified without departing from the gist thereof.

What is claimed is:

1. A platoon organization device that organizes a platoon of vehicles transporting packages, the platoon organization device comprising:
at least one processor programmed to:
acquire operation plan information including a departure place, a destination, and information indicating whether the vehicle corresponds to a special vehicle, of each vehicle, the special vehicle being a vehicle having at least one of a predetermined function and equipment that resolves an event when the event that requires stopping of the vehicle occurs in at least one of the vehicle and a driver;
extract a plurality of vehicles having at least a part of sections in common in a course from the departure place to the destination, based on the operation plan information;
organize a platoon including the extracted vehicles such that at least one special vehicle is included in a vehicle group organizing the platoon from a platoon departure place, which is a departure place of the platoon, to a platoon destination, which is a destination of the platoon; and
output platoon information indicating the organized platoon,
wherein the special vehicle is a repair vehicle or a toilet vehicle, wherein the repair vehicle is a vehicle having equipment for repairing the vehicle, and wherein the toilet vehicle is a vehicle provided with a toilet for use by an occupant, and
wherein the platoon is organized such that the repair vehicle or the toilet vehicle is included in the vehicle group organizing the platoon from the platoon departure place to the platoon destination.

2. The platoon organization device according to claim 1, wherein the at least one processor is programmed to organize the platoon such that a leading vehicle group including at least one vehicle of which a destination is the platoon destination is disposed at a head of the platoon and the special vehicle is included in the leading vehicle group.

3. The platoon organization device according to claim 1, wherein at least one process is programmed to, when organizing a first special vehicle of which a departure place is the platoon departure place and a destination is an intermediate place between the platoon departure place and the platoon destination by including the first special vehicle in the platoon, organize a second special vehicle of which a departure place is the intermediate place and a destination is the platoon destination by including the second special vehicle in the platoon.

4. The platoon organization device according to claim 1, wherein the operation plan information includes information indicating whether the vehicle is at least one of an unmanned autonomous driving vehicle and a manned vehicle, and a manned vehicle is disposed at a head of the platoon.

5. A platoon organization method in a platoon organization device that organizes a platoon of vehicles transporting packages, the platoon organization method comprising:

acquiring operation plan information including a departure place, a destination, and information indicating whether the vehicle corresponds to a special vehicle, of each vehicle, the special vehicle being a vehicle having at least one of a predetermined function and equipment that resolves an event when the event that requires stopping of the vehicle occurs in at least one of the vehicle and a driver;

extracting a plurality of vehicles having at least a part of sections in common in a course from the departure place to the destination, based on the operation plan information;

organizing a platoon including the vehicles extracted by the step of extracting such that at least one special vehicle is included in a vehicle group organizing the platoon from a platoon departure place, which is a departure place of the platoon, to a platoon destination, which is a destination of the platoon; and outputting platoon information indicating the platoon organized by the step of organizing, wherein the special vehicle is a repair vehicle or a toilet vehicle, wherein the repair vehicle is a vehicle having equipment for repairing the vehicle, and wherein the toilet vehicle is a vehicle provided with a toilet for use by an occupant, and organizing the platoon such that the repair vehicle or the toilet vehicle is included in the vehicle group organizing the platoon from the platoon departure place to the platoon destination.

* * * * *